US007240475B2

(12) United States Patent
Smeets et al.

(10) Patent No.: US 7,240,475 B2
(45) Date of Patent: Jul. 10, 2007

(54) ROUNDSLING

(75) Inventors: Paulus Johannes Hyacinthus Marie Smeets, Geulle (NL); Christiaan Henri Peter Dirks, Dilsen (BE)

(73) Assignee: DSM IP Assets B.V., Te Heerlen (NL)

( * ) Notice: Subject to any disclaimer, the term of this patent is extended or adjusted under 35 U.S.C. 154(b) by 0 days.

(21) Appl. No.: 10/543,569

(22) PCT Filed: Jan. 28, 2004

(86) PCT No.: PCT/NL2004/000061

§ 371 (c)(1),
(2), (4) Date: Oct. 5, 2005

(87) PCT Pub. No.: WO2004/067434

PCT Pub. Date: Aug. 12, 2004

(65) Prior Publication Data

US 2006/0119120 A1 Jun. 8, 2006

Related U.S. Application Data

(60) Provisional application No. 60/464,116, filed on Apr. 21, 2003.

(30) Foreign Application Priority Data

Jan. 30, 2003 (EP) ................................. 03075291

(51) Int. Cl.
*F16G 9/00* (2006.01)

(52) U.S. Cl. ............................................ 57/201; 57/21

(58) Field of Classification Search .................. 57/201, 57/202, 21
See application file for complete search history.

(56) References Cited

U.S. PATENT DOCUMENTS 3,707,021 A 12/1972 Norrman (Continued)

FOREIGN PATENT DOCUMENTS

GB 2 042 414 9/1980

(Continued)

OTHER PUBLICATIONS

John Hooker, "Latest Synthetic Fibre Rope Developments in the Towage Industry"; Marlow Ropes Limited; Mar. 2000; pp. 1-7; XP-002246034.

(Continued)

*Primary Examiner*—Shaun R. Hurley
(74) *Attorney, Agent, or Firm*—Nixon & Vanderhye P.C.

(57) ABSTRACT

The invention is related to a roundsling in the form of an endless loop consisting of a core containing at least two turns of a load-bearing strand material comprising fibres with a tenacity of at least 10 cN/dTex and a protective covering around said core, wherein the strand material is in the form of a braided or laid rope, the terminal ends of which are connected with a splice. The invention further relates to a method for constructing a roundsling comprising a step of winding a braided or laid rope on two reels such that part of the turns is on the reels and another part is between the reels wherein the part between the reels is supported, and a step of making a splice in the two terminal ends of the rope.

10 Claims, 1 Drawing Sheet

U.S. PATENT DOCUMENTS

Figure 1:
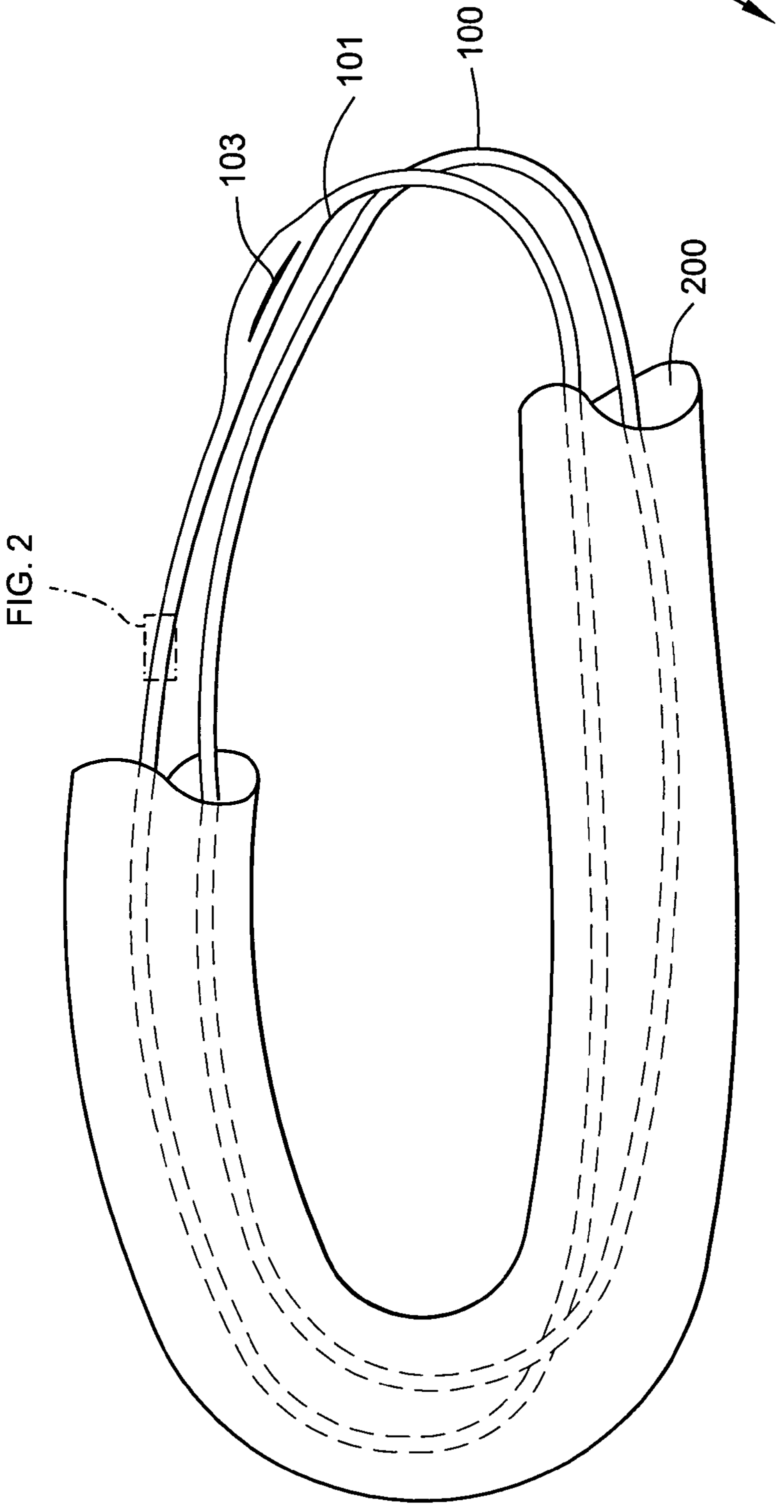

| | | | | |
|---|---|---|---|---|
| 3,722,942 | A | 3/1973 | Baur | |
| 4,022,507 | A | 5/1977 | Marino | |
| 4,052,095 | A | 10/1977 | Johnson | |
| 4,210,089 | A | 7/1980 | Lindahl | |
| 4,593,599 | A | 6/1986 | Yeardley | |
| 4,843,807 | A | 7/1989 | von Danwitz | |
| 4,850,629 | A | 7/1989 | St. Germain | |
| 5,492,383 | A | 2/1996 | Kentner, Sr. | |
| 5,651,572 | A | 7/1997 | St. Germain | |
| 7,107,749 | B2 | 9/2006 | Wetzels et al. | 57/22 |
| 2006/0048494 | A1 * | 3/2006 | Wetzels et al. | 57/22 |

FOREIGN PATENT DOCUMENTS

| | | | |
|---|---|---|---|
| JP | 2000177977 | A | 6/2000 |

OTHER PUBLICATIONS

E. Roerdink et al; “Past and Future of High Performance Fibres”; DSM High Performance Fibers; Polymer Fibres 2002; Jul. 10-12, 2002; pp. 1-3; XP-002246033.

European Committee for Standardization; “Textile slings—Safety—Part 2: Roundslings, made of man-made fibres, for general purpose use”; Jul. 2000; EN 1492-2.

Dan Pellow; “New Composite Yarn Developed for Slingmax-TPXC Twin-Path Extra Slings”; Wire Rope News & Sling Technology; Aug. 2002.

SlingMax Rigging Products; “High Performance Fiber Slings”; Twin-Path Extra.

Thomas G. Dolan; “Advances in Fiber Technology—A Threat to Wire Rope?”; Wire Rope News & Sling Technology; Apr. 2002.

International Search Report.

* cited by examiner

ROUNDSLING

This application is the US national phase of international application PCT/NL2004/000061 filed 28 Jan. 2004 which designated the U.S. and claims benefit of EP 03075291.9, dated 30 Jan. 2003 and U.S. 60/464,116, dated 21 Apr. 2003, the entire content of which is hereby incorporated by reference.

FIELD OF INVENTION

The invention relates to a roundsling. Roundslings are used as connecting means between a lifting or other handling device and goods that are to be loaded or unloaded. A roundsling is an endless flexible sling or loop that generally consists of a load-bearing core containing at least two turns of a load-bearing strand material and a protective cover (or jacket) around said core. The invention specifically relates to roundslings with a core comprising fibres with a tenacity of at least 10 cN/dTex.

BACKGROUND AND SUMMARY OF INVENTION

Such a roundsling is for example known from U.S. Pat. Nos. 4,210,089 and 4,850,629. These patent publications disclose roundslings comprising a load-bearing core in the form of parallel turns (also called loops) of load bearing strand material contained within tubular cover means. These roundslings are constructed by forming an endless loop of strands of load-bearing material to form a load-bearing core, e.g. by placing a plurality of turns of said strands in parallel relationship on a surface having guide means mounted on said surface, fastening said turns at their terminal ends to holding means, pulling a tubular cover means having two ends over one of said guide means to envelop said turns, fastening the terminal ends of said parallel load-bearing turns and fastening the terminal ends of said cover means to form an endless loop. In the prior art, the terminal ends of the load-bearing strand material would ordinarily be fastened to another end of a strand of the same material, thus forming an end connection and the entire inner core of load-bearing material would be hidden inside the cover material. Typically, fastening of ends is done by making an end-to-end connection, or by connecting an end to an adjacent turn, e.g. by knotting or with adhesive tape. In case of rounslings that contain a fabric webbing as load-bearing core, the connection can also be made by stitching; as in for example U.S. Pat. No. 4,022,507.

In EP 785 163 A1 a roundsling is described with a load-bearing core containing a filament fibre selected from polyester (e.g. Dacron®), aramid (e.g. Kevlar®), or polyethylene (e.g. Spectra®). A preferred embodiment of EP 785 163 A1 is a roundsling construction comprising a high performance fibre with a tenacity of at least 10 cN/dTex, such as Kevlar® or Spectra® fibre, as a component of the load-bearing core; which construction is light and strong.

A disadvantage of the known roundslings comprising high performance fibers is that their efficiency is rather low. The efficiency of a roundsling here and hereafter is the ratio (in %) of the tenacity of the load-bearing core and the tenacity of the fibre. The efficiency of known roundslings comprising a core of high performance fibres typically is about 20%.

It is the aim of the present invention to provide a roundsling with a higher efficiency then the known slings.

This aim is achieved with a roundsling wherein the strand material is a braided or laid rope, the terminal ends of which are connected with a splice.

With the roundsling of the invention an efficiency of more than 40% can be obtained. The roundsling according to the invention therefore can be made lighter than the known roundslings having the same loading capacity. An extra advantage is the lower volume that can thus be obtained.

In this application a splice is understood to be a tucked or a buried splice, as described in for example The Splicing Handbook, "Techniques for Modern and Traditional Ropes", by Barbara Merry with John Darwin, ISBN 0-87742-952-9.

In U.S. Pat. No. 4,493,599 buoyant rope assemblies are disclosed that contain a spliced rope. The assemblies described, however, concern a grommet or a hawser but not a roundsling. A grommet is a single endless loop formed by joining two lengths of ropes by end-to-end splices in each leg; a hawser is a single rope with an eye at each end. Nowhere in this publication it is suggested that connecting terminal ends with a splice in a roundsling containing multiple turns of load bearing material would be advantageous.

A roundsling according to European requirements typically comprises 11 turns for one end connection as described in e.g. the standard for polypropylene, polyamide and polyester roundslings EN-1492-2. This relatively high number of turns is required because the end connection in the known roundslings generally is unreliable, thus causing a high variation of the tenacity for slings with less than 11 turns. An advantage of the roundsling of the invention is that the variation of the tenacity is much smaller, even when the number of turns is lower than 11, or even lower than 8. An additional advantage of the roundsling according to the invention is, that also a better efficiency can be obtained when the number of turns is less than 11. Preferably the number of turns is between 2 and 9, or even between 2 and 7.

BRIEF DESCRIPTION OF THE ACCOMPANYING DRAWING

Figure 2:
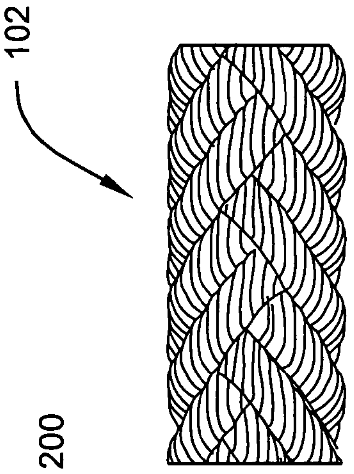

FIG. 1 is a schematic perspective view, partly in section, of a roundsling according to the present invention; and FIG. 2 is an enlarged schematic view of a portion of a braided rope employed as the core in the roundsling of FIG. 1.

DETAILED DESCRIPTION OF THE PREFERRED EMBODIMENTS

Accompanying FIG. 1 depicts schematically a roundsling RS according to the invention having a load bearing core 100 containing two turns 101 of a braded rope 102 and a protective covering 200 surrounding the load bearing core 100, the terminal ends of the braided rope being connected with a splice 103.

The core 100 of the roundsling RS of the invention comprises a braded or laid rope 102. A braded rope can comprise 3, 4, 6, 8, 12, 16 or 24 strands of fibres. The roundsling with a braided rope preferably comprises at least 12 strands. An advantage of a roundsling comprising braided rope with at least 12 strands is that the end connection can be a buried splice. A buried splice is constructed much faster than a tucked splice.

A laid rope in the core of the roundsling of the invention typically may comprise 3, 4, 6, or 6+1 strands. In another preferred embodiment of the invention the roundsling comprises a laid rope with a tucked splice, the advantage being very little slip in the connection.

The core 100 of the roundsling RS of the invention comprises a fibre with a tenacity of at least 10 cN/dTex. This can be any high performance fibre material, like polyester, polyamide, aromatic polyamide (aramid), poly(p-phenylene-2,6-binzobisoxazole), or polyethylene yarns. Preferably the fibre is a high modulus polyethylene (HMPE) fibre or yarn. HMPE fibre comprises highly-drawn fibres of high-molecular weight linear polyethylene. High molecular weight (or molar mass) here means a weight average molecular weight of at least 400,000 g/mol. Linear polyethylene here means polyethylene having fewer than 1 side chain per 100 C atoms, preferably fewer than 1 side chain per 300 C atoms, a side chain or branch generally containing more than 10 C atoms. The polyethylene may also contain up to 5 mol % of one or more other alkenes which are copolymerizable therewith, such as propylene, butene, pentene, 4-methylpentene, and octene.

Preferably, use is made of polyethylene fibres consisting of polyethylene filaments prepared by a gel spinning process as described in for example GB-A-2042414, GB-A-2051667, or WO 01/73173 A1. This process essentially comprises the preparation of a solution of a polyolefin of high intrinsic viscosity, spinning the solution into filaments at a temperature above the dissolving temperature, cooling the filaments to below the gelling temperature to from solvent-containing gel filaments and drawing the filaments before, during or after removal of the solvent.

Advantages of a core comprising HMPE fibres include high abrasion resistance, good resistance against fatigue under flexural loads, a low elongation resulting in an easier positioning, an excellent chemical and UV resistance and a high cut resistance.

In a preferred embodiment according to the invention the turns of rope are all parallel and of substantially equal length; the advantage of such a roundsling is its higher strength, since the turns in the core are more evenly loaded in use.

The terminal ends of the rope 102 in the roundsling RS according to the invention are connected with a splice 103. Various known tucked or buried splices may be applied. A particular suitable type of splice is a tucked splice, as for example disclosed in U.S. Pat. No. 7,107,749, that can be made in a laid rope in the roundsling RS by a method comprising steps wherein (a) one end of the rope is split in a first and a second part comprising respectively a first and a second number of strands, the first number of strands being at most one more than the second number of strands, (b) the first part is tucked from one side into an opening in the other end of the rope, such that the opening has a first number of strands on one side and a second number of strands on the other side, the first and second number differing at most by one, (c) the second part is tucked from the other side into the opening in the other end of the rope, (d) step (b) and (c) are repeated at least 3 respectively at least 3+1 times, whereby the consecutive openings in the second rope end are separated such that the first and the second part have crossed over at least all the strands of the other part of the rope once.

For an optimum connection, the same sequence of steps is preferably repeated for the other end of the rope. Preferably, the splice is tapered after step (d) in at least one step, by repeating steps (b) and (c) for at least 3 times with parts of the strands of each end. Such a tapered splice results in a further improvement of efficiency of the roundsling.

The advantage of the splice as described above is that it can be made in a shorter time than conventional splices, and that it can be made in-line with making of turns of rope in an economical way.

Even better results are obtained when the strand ends are coated with a polymeric coating material, e.g. a polyurethane dispersion like Beetafin L9010 or a modified polyurethane dispersion like LAGO 45 or 50, preferably before making the splice. Alternatively, the spliced rope is coated with said material. This coating allows a shorter splice without loosing efficiency or causing an increase of the variation of the tenacity. It also allows allows a shorter production time of the roundsling, as most of the production time is caused by the production of the splice. Using coated strands may reduce the production time with at least 50%.

The roundsling comprises a protective covering around the core. This cover or jacket does not form part of the invention, and can be any known material, like a woven or braided fabric, e.g. a woven polyester fabric.

The invention further relates to a method of constructing a roundsling, which method comprises forming an endless loop of a braided or laid rope comprising fibres with a tenacity of at least 10 cN/dTex by connecting the terminal ends of the rope with a splice.

The roundsling can be constructed according to a known method for example by making parallel turns or windings of the braided or laid rope on two reels such that part of the turns is on the reels and another part is between the reels. The reels generally are placed at a distance from each other, which depends on the length of the roundsling to be made. However, with this method some turns may sag, causing the resulting roundsling to contain turns with unequal lengths. Especially in case of fibres that have a relatively low elongation at break, like e.g. HMPE fibres, this would result in uneven loading of the turns in the core upon using the roundsling; which may damage the rope or even lead to premature breakage. The inventors found that turns of substantial equal length can be obtained by supporting the part of the turns between the reels. Supporting can for example be done by a gutter underneath the part of the turns between the reels.

The inventors further found that an even better efficiency and tenacity can be obtained by making an end connection, especially a splice, over or under all parallel turns of the braided or laid rope between reels as opposed to an end connection which crosses partly over and partly under the parallel turns.

The invention is further illustrated with the following examples and comparative experiments.

EXAMPLE 1

A roundsling core is made of a laid rope with three strands of HMPE fibres (construction 3×24×3/1760 dtex; Dyneema® SK 75) by making an end-to-end connection after 22 parallel aligned turns of rope around two reels, with the tucked splice according to the description above (of 8-4-4 construction; that is having 8 full tucks and tapered in two steps of 4 tucks). The splice passes over the parallel turns. Dyneema® SK 75 is a 1760 dtex HMPE continuous filament yarn with a yarn tenacity of 35 cN/dTex (a product of DSM High Performance Fibers, NL). After covering the core with a standard polyester cover the roundsling was tested and turned out to have a tenacity 15±2 cN/dtex; that is an efficiency of 43%.

EXAMPLE 2

A roundsling of 23 turns of 3×7/1760 dTex, (Dyneema® SK 75 1760 dtex yarn) coated with Lago 45 and spliced with a standard 8-4-4 tucked splice turned out to have a tenacity of 21 cN/dTex. The efficiency of this roundsling is 60%.

EXAMPLES 3–5

Example 1 was repeated, whereby the number of turns was varied. Table 1 shows that the efficiency increases with a decreasing number of turns.

TABLE 1

| Example | number of turns | Tenacity (cN/dTex) | Efficiency |
|---|---|---|---|
| 3 | 11 | 17.1 | 49% |
| 4 | 6 | 18.2 | 52% |
| 5 | 5 | 19 | 54% |

Comparative Experiment A

A roundsling containing 23 turns of a HMPE rope as in Example 2 (made from Dyneema® SK 75) with a taped end-to-end connection turned out to have a tenacity of maximum 6.5 cN/dTex.

A roundsling of 23 turns of a HMPE fibre (Dyneema SK 75) construction from 21 yarns with a knotted end connection turned out to have a tenacity of maximum 9.5 cN/dTex.

In both cases the roundsling failed at the end connection with a variation of ±25%. The efficiency was 19 and 27% respectively.

EXAMPLE 6

Example 1 was repeated to make cores with 11 parallel turns of a 3-strand laid rope (3×24×3/1760 dtex Dyneema® SK 75) and a 8-4-4 splice as described above that was made over all parallel turns. Roundslings with polyester covers were tested according to EN-1492-2. This industry standard prescribes a safety factor of 7, meaning a 20 ton roundsling should withstand a load of 140 tons. In a first test, the tenacity of the roundsling was determined to be 16.6 cN/dtex. Breaking at a load of 148600 kg was found to occur in the rope of the core, not in the connecting splice. In a further experiment, a roundsling was subjected to a tension fatigue test wherein the roundsling was pre-loaded 70 times at 75% (of 140 tons), before its breaking strength was determined. The tenacity of the roundsling was now 19.4 cN/dtex. Breaking at 174000 kg load occurred in the rope at the end region of the tapered splice.

The invention claimed is:

1. Roundsling consisting of a load-bearing core containing at least two turns of a load-bearing strand material comprising fibres with a tenacity of at least 10 cN/dTex and a protective covering around said core, wherein the strand material is a braided or laid rope, the terminal ends of which are connected with a splice.

2. Roundsling according to claim 1, wherein the load-bearing core contains between 2 and 7 turns of rope.

3. Roundsling according to claim 1, wherein the fibres are high modulus polyethylene fibres.

4. Roundsling according to claim 1, wherein the turns are all parallel and of substantially equal length.

5. Roundsling according to claim 1, wherein the splice is either over or under all turns of rope.

6. Method for constructing a roundsling according to claim 1, comprising a step of winding a braided or laid rope on two reels, thus forming parallel turns, such that part of the turns is on the reels and another part is between the reels, wherein the part between the reels is supported, and a step of making a splice in the two terminal ends of the rope.

7. Method according to claim 6, wherein the splice is made over or under all parallel turns of the rope between the reels.

8. Roundsling according to claim 1, wherein the strand material is a braided rope comprising at least 12 strands.

9. Roundsling according to claim 1, wherein the strand material is a laid rope with a tucked splice.

10. Roundsling according to claim 1, wherein the turns of rope are all parallel and of substantially equal length.

* * * * *

UNITED STATES PATENT AND TRADEMARK OFFICE

CERTIFICATE OF CORRECTION

PATENT NO. : 7,240,475 B2
APPLICATION NO. : 10/543569
DATED : July 10, 2007
INVENTOR(S) : Smeets et al.

It is certified that error appears in the above-identified patent and that said Letters Patent is hereby corrected as shown below:

Column 2, line 53, replace “braded” with --braided--; and

Column 2, line 58, replace two occurrences of “braded” with --braided--.

Signed and Sealed this

Twenty-third Day of June, 2009

JOHN DOLL

*Acting Director of the United States Patent and Trademark Office*